United States Patent
Matsuura

(10) Patent No.: US 8,107,898 B2
(45) Date of Patent: Jan. 31, 2012

(54) TRANSMITTER CIRCUIT AND COMMUNICATION DEVICE USING THE SAME

(75) Inventor: Toru Matsuura, Osaka (JP)

(73) Assignee: Panasonic Corporation, Osaka (JP)

( * ) Notice: Subject to any disclaimer, the term of this patent is extended or adjusted under 35 U.S.C. 154(b) by 329 days.

(21) Appl. No.: 12/604,709

(22) Filed: Oct. 23, 2009

(65) Prior Publication Data

US 2011/0098006 A1    Apr. 28, 2011

(51) Int. Cl.
*H04B 1/02* (2006.01)
(52) U.S. Cl. ......................... 455/102; 455/110
(58) Field of Classification Search .............. 455/91, 455/102, 103, 108, 110, 112, 113, 115.1, 455/127.1; 330/129, 278, 282, 285
See application file for complete search history.

(56) References Cited

U.S. PATENT DOCUMENTS

| | | | |
|---|---|---|---|
| 2007/0129032 A1* | 6/2007 | Matsuura et al. | 455/127.2 |
| 2010/0316164 A1* | 12/2010 | Liang et al. | 375/295 |
| 2011/0021165 A1* | 1/2011 | Lee | 455/127.5 |

* cited by examiner

*Primary Examiner* — Thanh Le
(74) *Attorney, Agent, or Firm* — Wenderoth, Lind & Ponack, L.L.P.

(57) ABSTRACT

A transmitter circuit of the present invention includes: a signal generator 101 that generates an amplitude signal and a phase signal based on an input signal; a signal processor 103 that divides the phase signal into a real component and an imaginary component, and performs a signal process on each of the real component and the imaginary component; BEFs 104, 105 that attenuate unnecessary frequency bands of a real component signal and an imaginary component signal, respectively, which are obtained as a result of the signal process performed by the signal processor; a coordinate system converter 106 that converts an orthogonal coordinate system, which is represented by the real component signal and the imaginary component signal of which the unnecessary frequency bands have been attenuated by the BEFs, to a polar coordinate system, which is represented by an amplitude component signal and a phase component signal; an adder 102 that adds the amplitude component signal provided by the coordinate system converter, to the amplitude signal generated by the signal generator; an angle modulator 107 that angle-modulates the phase component signal provided by the coordinate system converter; and an amplitude modulator 108 that amplitude-modulates the phase component signal which has been angle-modulated by the angle modulator, based on the amplitude signal which has the amplitude component signal added thereto and which is provided by the adder.

9 Claims, 7 Drawing Sheets

TRANSMITTER CIRCUIT AND COMMUNICATION DEVICE USING THE SAME

BACKGROUND OF THE INVENTION

1. Field of the Invention

The present invention relates to a transmitter circuit that is utilized in a mobile phone and a communication device such as a wireless LAN device. More particularly, the present invention relates to a transmitter circuit that performs a polar modulation, and a communication device using the transmitter circuit.

2. Description of the Background Art

A mobile phone and a communication device such as a wireless LAN device are desired to operate with low power consumption while ensuring the precision of a transmission signal, regardless of the output power level. Therefore, adopted in the communication device is a transmitter circuit which has a small size, operates with high efficiency, and performs a polar modulation for outputting a transmission signal having high linearity.

FIG. 4 is a diagram showing a conventional transmitter circuit 900 that performs a polar modulation. In FIG. 4, the transmitter circuit 900 includes a signal generator 901, a first low-pass filter (LPF) 902, a second low-pass filter (LPF) 903, a frequency modulator 904, and an amplitude modulator 905.

Based on an input signal, the signal generator 901 generates an amplitude signal and a frequency signal. The amplitude signal is, via the first LPF 902, inputted to the amplitude modulator 905. The frequency signal is, via the second LPF 903, inputted to the frequency modulator 904.

The frequency modulator 904 frequency-modulates the inputted frequency signal, and outputs a carrier wave. The carrier wave outputted from the frequency modulator 904 is inputted to the amplitude modulator 905.

Based on the amplitude signal inputted from the signal generator 901 via the first LPF 902, the amplitude modulator 905 amplitude-modulates the carrier wave inputted from the frequency modulator 904, and then outputs the amplitude-modulated carrier wave. In this manner, the transmitter circuit 900 performs the polar modulation on the input signal, and outputs a transmission signal.

The transmitter circuit 900 performs a digital signal process on the input signal, then performs a digital-analog conversion process on the resulting signal by means of a digital-analog converter (DAC) (not shown), and finally outputs the transmission signal which is an analog signal. The transmission signal outputted from the transmitter circuit 900 includes an unnecessary noise due to the influences of a clock frequency of the DAC, an image interference frequency, a noise of an analog circuit, a digital quantization noise, and the like. The first and second LPFs 902 and 903 are provided for removal of these various noises.

FIG. 5 is a diagram showing a relationship between a cut-off frequency of the LPF and an adjacent channel leakage ratio (ACLR), and a relationship between a cut-off frequency of the LPF and a noise in a receiver band.

The ACLR is a distortion which occurs near the transmission signal outputted from the transmitter circuit 900. Rise of the ACLR causes interference with another terminal. Thus, the ACLR has to be lowered. As shown in FIG. 5, by setting the cut-off frequency of the LPF high, the rise of the ACLR can be suppressed and the influence on another terminal can be reduced.

On the other hand, when the transmitter circuit 900 is used in a mobile phone that has a reception function for receiving a signal from a base station, the transmitter circuit 900 has to reduce a noise in the receiver band so as not to influence the reception function. As shown in FIG. 5, by setting the cut-off frequency of the LPF low, the noise in the receiver band can be suppressed and the influence thereof on the reception function of the mobile phone can be reduced.

However, when the cut-off frequency of the LPF is set too low, a signal necessary for the transmission signal which will be outputted from the transmitter circuit 900 is also removed, which distorts the transmission signal and thus raises the ACLR. That is, the ACLR and the noise in the receiver band are in a tradeoff relationship.

To solve the tradeoff problem described above, it is easily conceivable to use a band elimination filter (BEF) in a frequency signal path.

FIG. 6 is a diagram showing a transmitter circuit 910 including a BEF. The transmitter circuit 910 includes a signal generator 901, a first LPF 902, a second LPF 903, a frequency modulator 904, an amplitude modulator 905, and a BEF 911. The transmitter circuit 910 shown in FIG. 6 is different from the transmitter circuit 900 shown in FIG. 4, in that the transmitter circuit 910 includes the BEF 911. For the description of the transmitter circuit 910, the same components as those of the transmitter circuit 900 shown in FIG. 4 are denoted by the same corresponding reference numerals, respectively, and the description of the components is not given.

The frequency modulator 904 frequency-modulates an inputted frequency signal, and outputs a carrier wave. Here, the carrier wave outputted from the frequency modulator 904 has a constant envelope. The BEF 911 attenuates an unnecessary frequency band, such as the reception frequency band, within the carrier wave outputted from the frequency modulator 904.

The carrier wave, in which the unnecessary frequency band has been attenuated by the BEF 911, is inputted to the amplitude modulator 905. However, the amplitude modulator 905 has no ability to sense the variation of the envelope of the carrier wave in which the unnecessary frequency band has been attenuated by the BEF 911. That is, a characteristic obtained by attenuating the unnecessary frequency band by the BEF 911 is lost.

Based on an amplitude signal inputted from the signal generator 901 via the first LPF 902, the amplitude modulator 905 amplitude-modulates the carrier wave inputted from the BEF 911, and then outputs the amplitude-modulated carrier wave. The envelope level of the carrier wave is determined based on the amplitude signal inputted from the signal generator 901 via the first LPF 902.

SUMMARY OF THE INVENTION

Therefore, an object of the present invention is to realize a transmitter circuit which includes a BEF in a frequency signal path, for solving the problem of tradeoff between an ACLR and a noise in a receiver band, and which amplitude-modulates and outputs a carrier wave in such a manner that a characteristic obtained by attenuating an unnecessary frequency band by the BEF is not lost, and also to realize a communication device using the transmitter circuit.

To achieve the aforementioned object, a transmitter circuit of the present invention is a transmitter circuit which outputs a transmission signal by performing a polar modulation on an input signal, the transmitter circuit including: a signal generator that generates an amplitude signal and a phase signal based on the input signal; a signal processor that divides the phase signal into a real component and an imaginary component, and performs a signal process on each of the real component and the imaginary component; a filter that attenuates unnecessary frequency bands of a real component signal and an imaginary component signal, respectively, which are obtained as a result of the signal process performed by the signal processor; a coordinate system converter that converts an orthogonal coordinate system, which is represented by the real component signal and the imaginary component signal of which the unnecessary frequency bands have been attenuated by the filter, to a polar coordinate system, which is represented by an amplitude component signal and a phase component signal; an adder that adds the amplitude component signal provided by the coordinate system converter, to the amplitude signal generated by the signal generator; an angle modulator that angle-modulates the phase component signal provided by the coordinate system converter; and an amplitude modulator that amplitude-modulates the phase component signal which has been angle-modulated by the angle modulator, based on the amplitude signal which has the amplitude component signal added thereto and which is provided by the adder.

It is preferable that the filter is a band elimination filter or a low-pass filter.

It is preferable that the transmitter circuit further includes: a low-pass filter that allows a desired frequency band of the amplitude signal, which has the amplitude component signal added thereto and which is provided by the adder, to pass therethrough; and a pre-emphasis filter that compensates for a characteristic of attenuation, which is performed by the low-pass filter, on the amplitude component signal provided by the coordinate system converter.

Alternatively, it is preferable that the transmitter circuit further includes: a low-pass filter that allows a desired frequency band of the amplitude signal, which has the amplitude component signal added thereto and which is provided by the adder, to pass therethrough; an amplitude amplifier that amplifies the amplitude signal which has passed through the low-pass filter; and a pre-emphasis filter that compensates for a characteristic of attenuation, which is performed by the low-pass filter and the amplitude amplifier, on the amplitude component signal provided by the coordinate system converter.

Furthermore, it is preferable that the transmitter circuit further includes a low-pass filter that allows a desired frequency band of the phase component signal, which is provided by the coordinate system converter, to pass therethrough.

To achieve the aforementioned object, a communication device of the present invention includes: a transmitter circuit that generates a transmission signal; and an antenna that outputs the transmission signal generated by the transmitter circuit, and the transmitter circuit is the above-described transmitter circuit.

Furthermore, it is preferable that the communication device further includes: a receiver circuit that processes a reception signal received from the antenna; and an antenna duplexer that outputs, to the antenna, the transmission signal generated by the transmitter circuit, and outputs, to the receiver circuit, the reception signal received from the antenna.

To achieve the aforementioned object, a transmission method of the present invention is a transmission method of outputting a transmission signal by performing a polar modulation on an input signal, the transmission method including the steps of: generating an amplitude signal and a phase signal, based on the input signal; dividing the phase signal into a real component and an imaginary component, and performing a signal process on each of the real component and the imaginary component; attenuating unnecessary frequency bands of a real component signal and an imaginary component signal, respectively, which are obtained as a result of the signal process; converting an orthogonal coordinate system, which is represented by the real component signal and the imaginary component signal of which the unnecessary frequency bands have been attenuated, to a polar coordinate system, which is represented by an amplitude component signal and a phase component signal; adding the amplitude component signal to the amplitude signal; angle-modulating the phase component signal; and amplitude-modulating the phase component signal which has been angle-modulated, based on the amplitude signal which has the amplitude component signal added thereto.

As described above, in the transmitter circuit and the communication device using the transmitter circuit according to the present invention, the BEF is provided in a frequency signal path, for solving the problem of tradeoff between an ACLR and a noise in a receiver band, and moreover the carrier wave can be amplitude-modulated and outputted in such a manner that the characteristic obtained by attenuating the unnecessary frequency band by the BEF is not lost.

The present invention is applicable to a mobile phone, a communication device such as a wireless LAN device, and the like, and is useful in, for example, a mobile phone having a transmission/reception function which suppresses rise of an ACLR and reduces a noise in a receiver band.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1A:
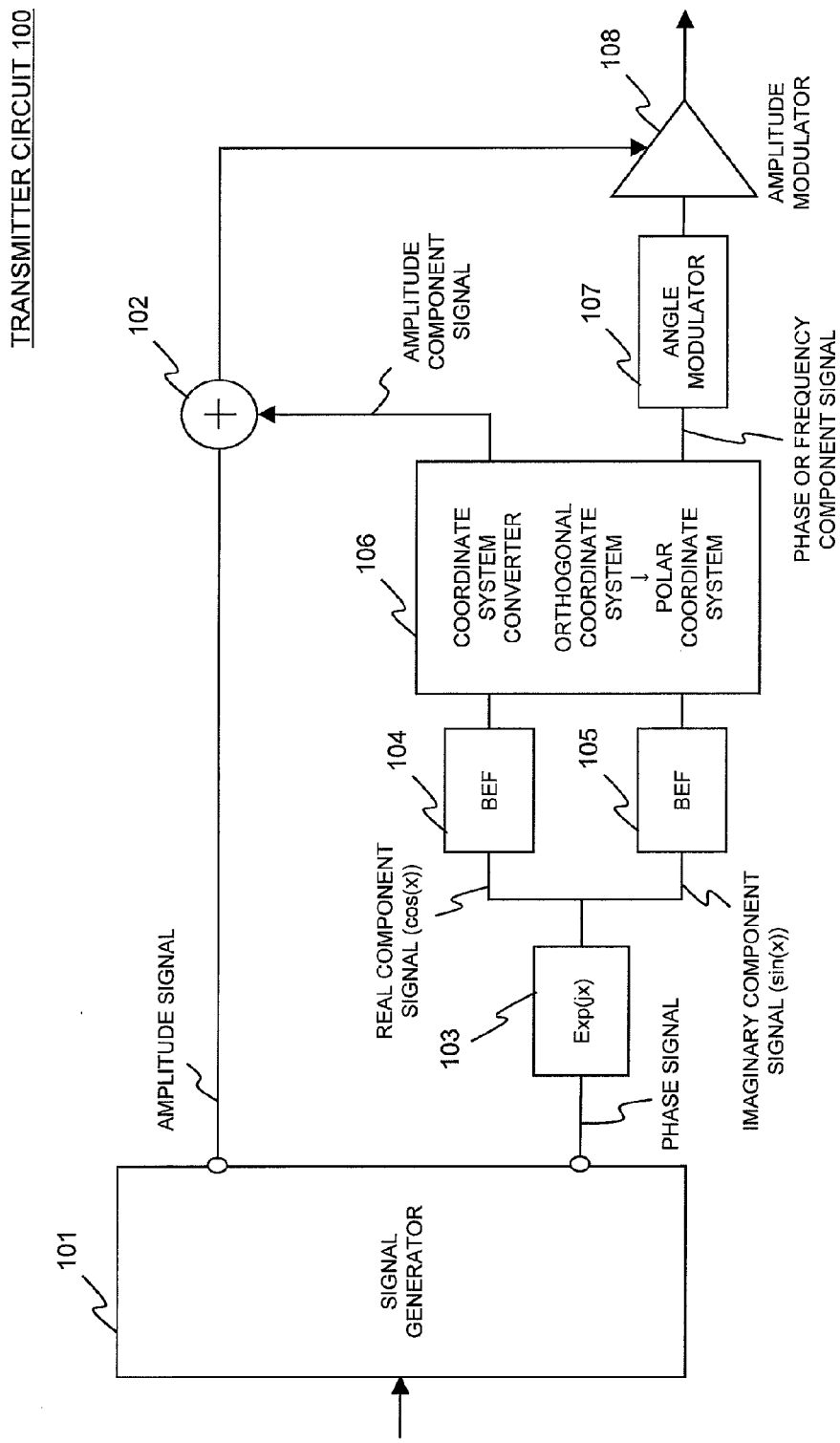
FIG. 1A is a diagram showing a transmitter circuit 100 according to a first embodiment of the present invention.

FIG. 1A is a diagram showing a transmitter circuit 100 according to a first embodiment of the present invention. In FIG. 1A, the transmitter circuit 100 includes a signal generator 101, an adder 102, a signal processor 103, a first BEF 104, a second BEF 105, a coordinate system converter 106, an angle modulator 107, and an amplitude modulator 108.

Based on an input signal, the signal generator 101 generates an amplitude signal and a phase signal.

The signal processor 103 outputs a phase modulation signal, by performing an exp(jx) computation, for example.

Here, a signal computation process, which is generally represented by the equation $S(t)=\exp(j\omega t+jx)$, will be described, considering a baseband signal where $\omega=0$. The inputted phase signal is divided into a real component signal ($\cos(x)$) and an imaginary component signal ($\sin(x)$), and then a signal process is performed. That is, the signal becomes a baseband signal in an orthogonal coordinate system represented by I-data (in-phase data) and Q-data (quadrature-phase data) which are orthogonal to each other.

The first BEF 104 attenuates an unnecessary frequency band of the real component signal ($\cos(x)$), and outputs the resulting signal to the coordinate system converter 106. The second BEF 105 attenuates an unnecessary frequency band of the imaginary component signal ($\sin(x)$), and outputs the resulting signal to the coordinate system converter 106.

Here, the first and second BEFs 104 and 105 are arranged in parallel, and the real component signal ($\cos(x)$) and the imaginary component signal ($\sin(x)$) are processed in parallel. However, the first and second BEFs 104 and 105 may be configured as a single component, and the real component signal ($\cos(x)$) and the imaginary component signal ($\sin(x)$) may be serially processed.

The coordinate system converter 106 converts the coordinate system of the baseband signal, from the orthogonal coordinate system to a polar coordinate system. Specifically, the orthogonal coordinate system represented by the real component signal ($\cos(x)$), of which the unnecessary frequency band has been attenuated, and the imaginary component signal ($\sin(x)$), of which the unnecessary frequency band has been attenuated, is converted to a polar coordinate system represented by an amplitude component signal and a phase component signal.

The amplitude component signal generated by the coordinate system converter 106 is inputted to the adder 102. The adder 102 adds the amplitude component signal to the amplitude signal generated by the signal generator 101, and outputs the resulting signal to the amplitude modulator 108.

On the other hand, the phase component signal generated by the coordinate system converter 106 is inputted to the angle modulator 107. The angle modulator 107 phase-modulates the inputted phase component signal, and outputs a phase modulation signal with radio frequency.

Based on the amplitude signal outputted from the adder 102, the amplitude modulator 108 amplitude-modulates the phase modulation signal outputted from the angle modulator 107, and outputs the amplitude-modulated and phase-modulated signal.

In this manner, in the transmitter circuit 100, the signal processor 103 performs the signal process on the phase signal generated by the signal generator 101, and then the unnecessary frequency bands are attenuated by the first and second BEFs 104 and 105, respectively.

As described above, the transmitter circuit 100 according to the first embodiment of the present invention includes the first and second BEFs 104 and 105 in a frequency signal path, for solving the problem of tradeoff between an ACLR and a noise in a receiver band. Moreover, by inputting, to the adder 102 provided in an amplitude signal path, the amplitude component signal which has the characteristic obtained by attenuating the unnecessary frequency band, the transmitter circuit 100 can amplitude-modulate and output the angle-modulated wave in such a manner that the characteristic obtained by attenuating the unnecessary frequency band is not lost.

In the transmitter circuit 100 according to the first embodiment of the present invention, the signal generator 101 generates the amplitude signal and the phase signal. However, similarly to the signal generator 901 of the conventional transmitter circuit 900, the signal generator 101 may generate an amplitude signal and a frequency signal. In a case where the signal generator 101 generates a frequency signal, the signal processor 103 may include an integrator, to integrate an inputted frequency signal, thereby generating a phase signal.

In the transmitter circuit 100 according to the first embodiment of the present invention, the coordinate system converter 106 generates the amplitude component signal and the phase component signal. However, the coordinate system converter 106 may generate an amplitude component signal and a frequency component signal. In a case where the coordinate system converter 106 generates a frequency component signal, the angle modulator 107 may frequency-modulate the frequency component signal generated by the coordinate system converter 106.

Figure 1B:
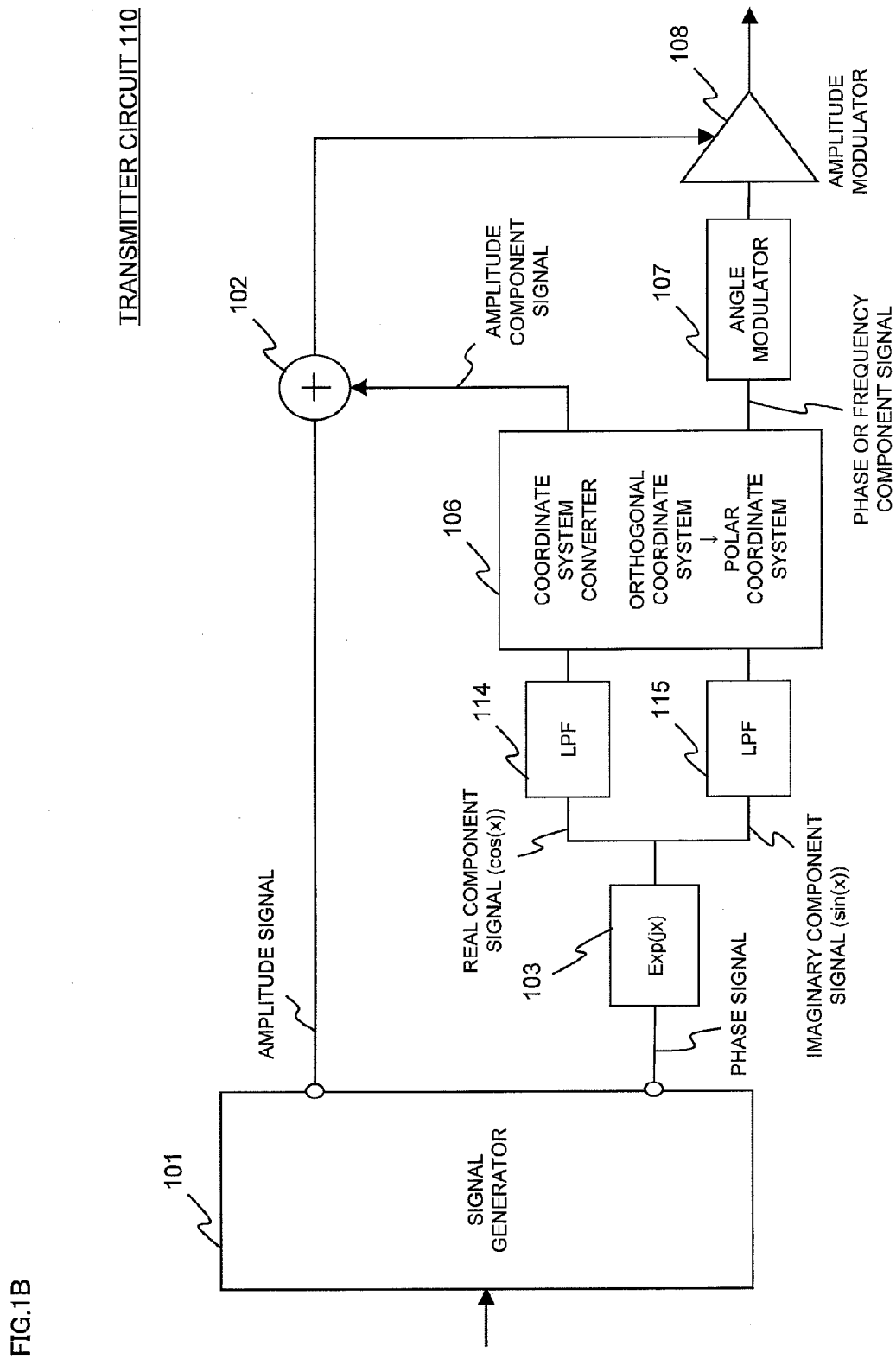
FIG. 1B is a diagram showing a transmitter circuit 110 using LPFs, according to the first embodiment of the present invention.

In the transmitter circuit 100 according to the first embodiment of the present invention, the first and second BEFs 104 and 105 are used. However, an LPF may be used for example. FIG. 1B is a diagram showing a transmitter circuit 110 using LPFs, according to the first embodiment of the present invention. In FIG. 1B, the transmitter circuit 110 includes first and second LPFs 114 and 115, instead of the first and second BEFs 104 and 105 of the transmitter circuit 100 shown in FIG. 1A. Obviously, the transmitter circuit 110 shown in FIG. 1B can exert the same effects as those of the transmitter circuit 100 shown in FIG. 1A.

Second Embodiment

Figure 2:
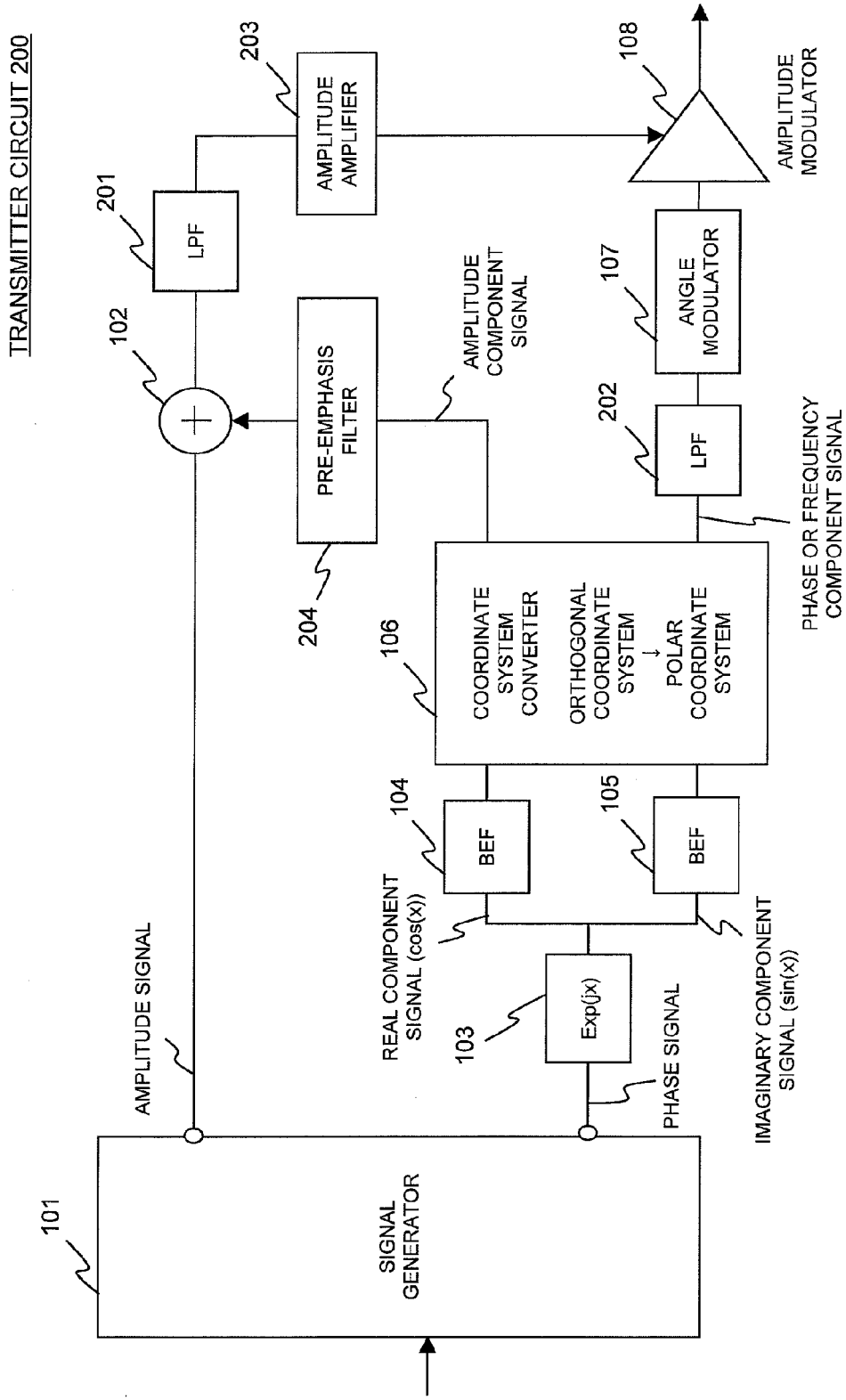
FIG. 2 is a diagram showing a transmitter circuit 200 according to a second embodiment of the present invention.

FIG. 2 is a diagram showing a transmitter circuit 200 according to a second embodiment of the present invention. In FIG. 2, the transmitter circuit 200 includes a signal generator 101, an adder 102, a signal processor 103, a first BEF 104, a second BEF 105, a coordinate system converter 106, an angle modulator 107, an amplitude modulator 108, a first low-pass filter (LPF) 201, a second low-pass filter (LPF) 202, an amplitude amplifier 203, and a pre-emphasis filter 204. In FIG. 2, the same components as those of the transmitter circuit 100 according to the first embodiment of the present invention shown in FIG. 1A are denoted by the same corresponding reference numerals, respectively, and the description of the components is not given.

The transmitter circuit 200 according to the present embodiment is different from the transmitter circuit 100 according to the first embodiment of the present invention shown in FIG. 1A, in that the transmitter circuit 200 includes the first and second LPFs 201 and 202, the amplitude amplifier 203, and the pre-emphasis filter 204.

The transmitter circuit 200 according to the present embodiment performs a digital signal process on an input signal, then performs a digital-analog conversion process on the resulting signal by means of a digital-analog converter (DAC) (not shown), and finally outputs a transmission signal which is an analog signal. The transmission signal outputted from the transmitter circuit 200 includes an unnecessary noise due to the influences of a clock frequency of the DAC, an image interference frequency, a noise of an analog circuit, a digital quantization noise, and the like. The first and second LPFs 201 and 202 are provided for removal of these various noises.

The first LPF 201 allows a desired frequency band of an amplitude signal outputted from the adder 102, to pass therethrough. Specifically, the first LPF 201 allows a low frequency band of the amplitude signal to pass therethrough as a signal, and blocks a high frequency band of the amplitude signal by attenuating the high frequency band, to thereby remove a noise of the high frequency band.

The amplitude amplifier 203 amplifies the amplitude signal filtered by the first LPF 201, and thereby adjusts the power of the amplitude signal to be inputted to the amplitude modulator 108.

As described above, the first LPF 201 attenuates the high frequency band of the amplitude signal outputted from the adder 102. The pre-emphasis filter 204 compensates for a high-frequency component which is attenuated by the first LPF 201. Specifically, when a characteristic of attenuation of the high frequency band performed by the first LPF 201 is defined as $H_{LPF(f)}$, a compensation characteristic $H_{COMP(f)}$ of a compensation performed by the pre-emphasis filter 204 is $1/H_{LPF(f)}$. The pre-emphasis filter 204 adds the compensation characteristic $H_{COMP(f)}$ to the amplitude component signal generated by the coordinate system converter 106, and outputs, to the adder 102, the amplitude component signal including the compensation characteristic $H_{COMP(f)}$.

The adder 102 adds the amplitude component signal including the compensation characteristic $H_{COMP(f)}$, to the amplitude signal generated by the signal generator 101. Then, the adder 102 outputs the resulting signal to the first LPF 201. As a result, even if the first LPF 201 attenuates a high-frequency component (attenuation characteristic $H_{LPF(f)}$), the attenuation characteristic $H_{LPF(f)}$ for the high-frequency component is compensated for because the pre-emphasis filter 204 adds, in advance, the compensation characteristic $H_{COMP(f)}$ to the amplitude component signal.

The second LPF 202 filters the phase component signal generated by the coordinate system converter 106, and outputs the resulting signal to the angle modulator 107. The angle modulator 107 phase-modulates the filtered phase component signal, and outputs an angle-modulated wave.

Based on the amplitude signal provided by the amplitude amplifier 203, the amplitude modulator 108 amplitude-modulates the angle-modulated wave outputted from the angle modulator 107, and outputs the resulting wave.

In this manner, the transmitter circuit 200 includes the first and second LPFs 201 and 202 for removing various noises, and moreover includes the pre-emphasis filter 204 for compensating for the characteristic of attenuation in the first LPF 201.

As described above, the transmitter circuit 200 according to the second embodiment of the present invention includes the first and second BEFs 104 and 105 in the frequency signal path, for solving the problem of tradeoff between an ACLR and a noise in a receiver band. Moreover, by inputting, to the adder 102 provided in an amplitude signal path, the amplitude component signal which has the characteristic obtained by attenuating the unnecessary frequency band, the transmitter circuit 200 can amplitude-modulate and output the angle-modulated wave in such a manner that the characteristic obtained by attenuating the unnecessary frequency band is not lost.

Furthermore, in the transmitter circuit 200 according to the second embodiment of the present invention, various noises can be removed by providing the first and second LPFs 201 and 202, and the high-frequency component attenuated by the first LPF 201 can be compensated for by the pre-emphasis filter 204 adding the compensation characteristic to the amplitude component signal.

In the transmitter circuit 200 according to the second embodiment of the present invention, the characteristic $H_{LPF(f)}$ of the attenuation of the high-frequency component is a characteristic of attenuation of the high frequency band performed by the first LPF 201. However, the characteristic $H_{LPF(f)}$ may be a characteristic of attenuation of the high frequency band performed by the first LPF 201 and the amplitude amplifier 203. In such a case, the pre-emphasis filter 204 may compensate for the high-frequency component attenuated by the first LPF 201 and the amplitude amplifier 203. Furthermore, it is difficult that the characteristic of the pre-emphasis filter 204 is set to the inverse of the characteristic $H_{LPF(f)}$ throughout the entire frequency range. In this case, the inverse of the characteristic $H_{LPF(f)}$ may be ensured in a frequency range that is included in the amplitude component signal outputted from the coordinate system converter 106.

Third Embodiment

Figure 3:
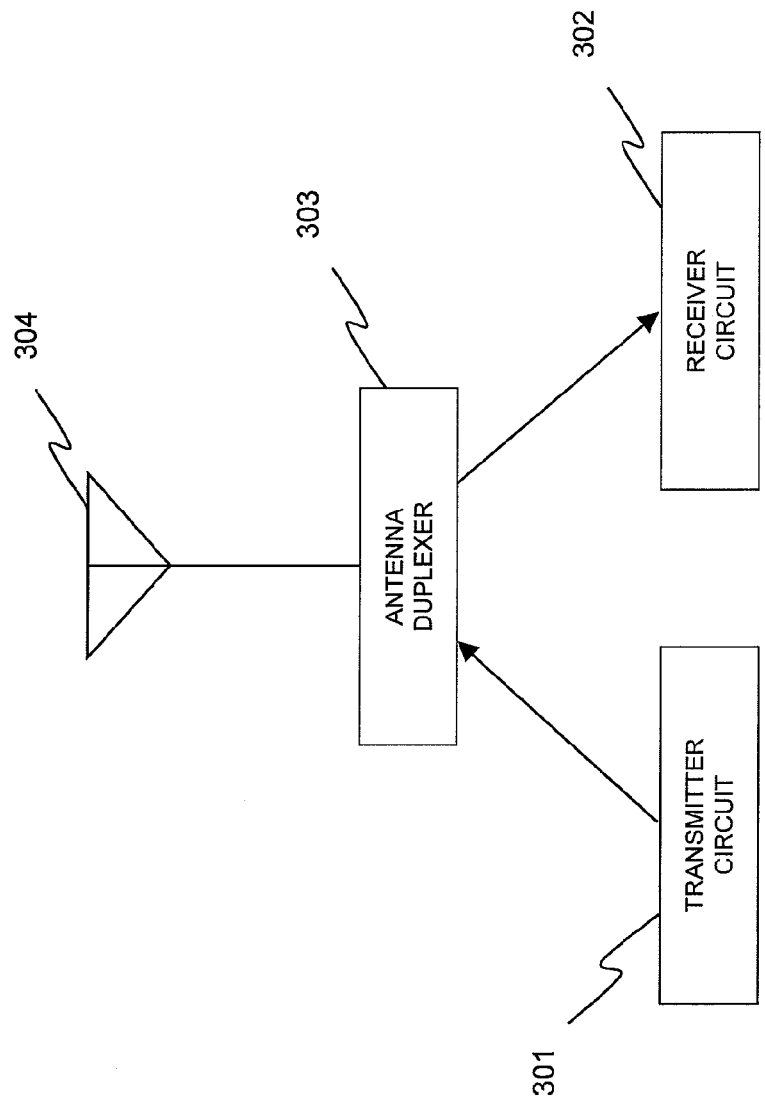
FIG. 3 is a diagram showing a communication device 300 according to a third embodiment of the present invention.
Figure 4:
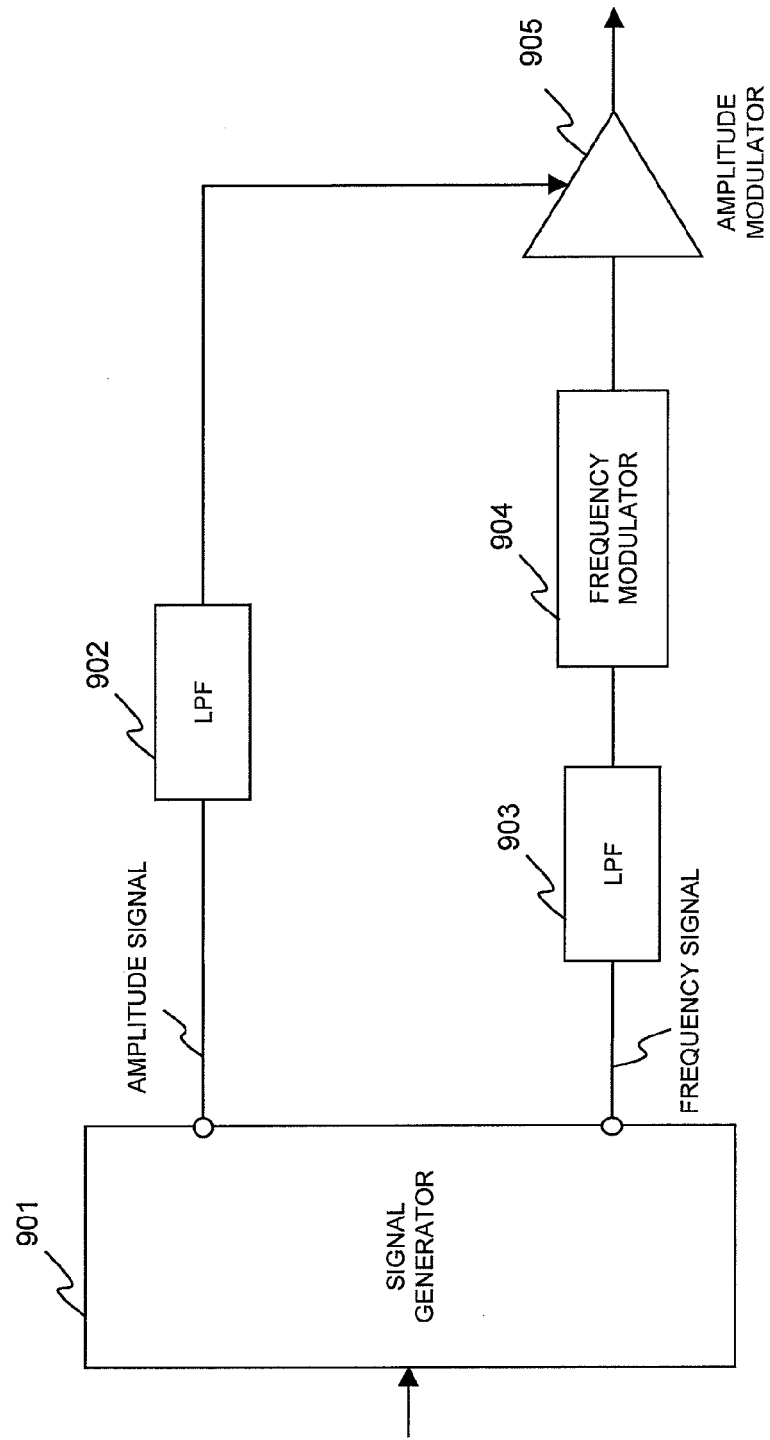
FIG. 4 is a diagram showing a conventional transmitter circuit 900 using a polar modulation.
Figure 5:
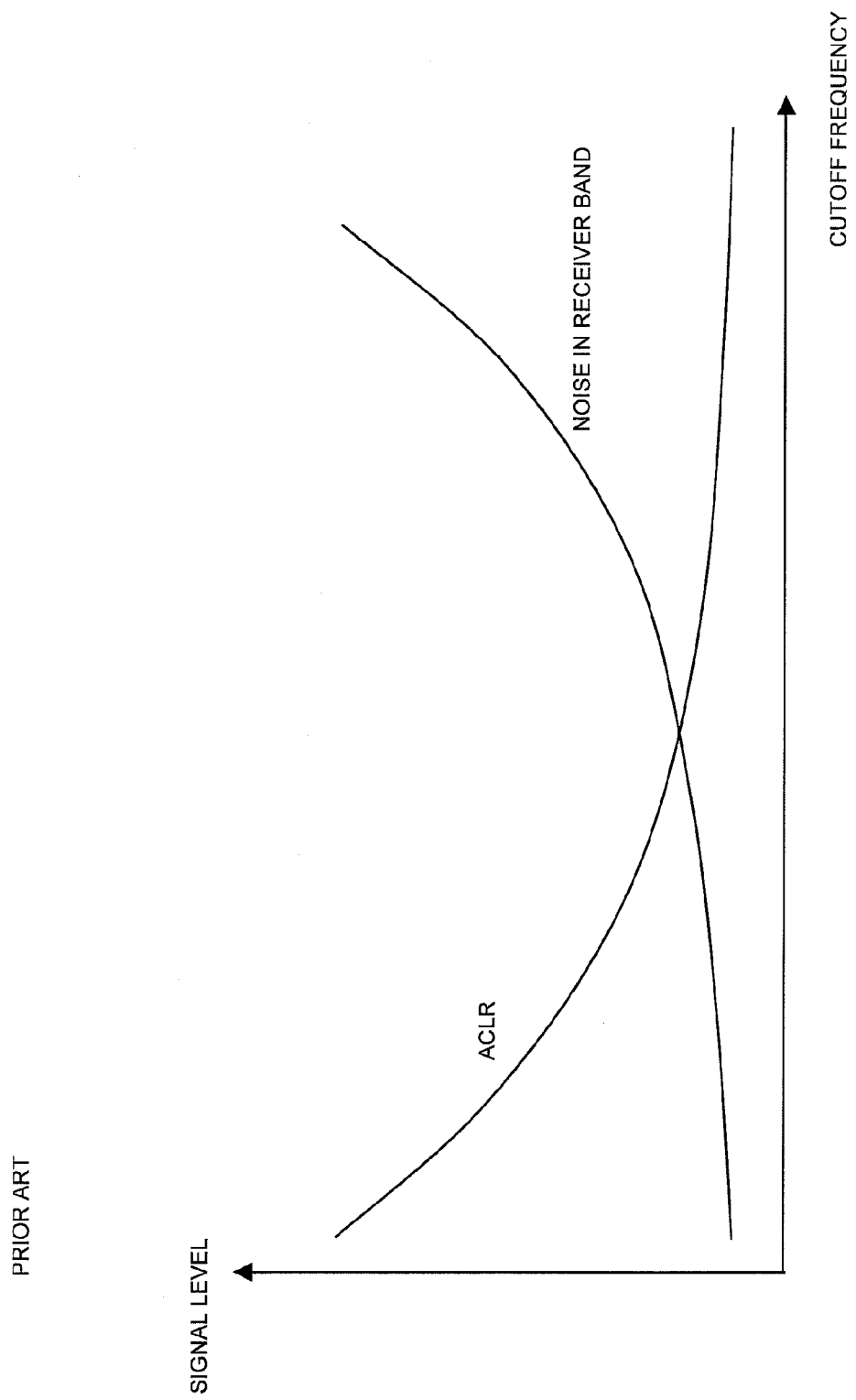
FIG. 5 is a diagram showing a relationship between a cut-off frequency of an LPF and an ACLR, and a relationship between a cut-off frequency of an LPF and a noise in a receiver band.
Figure 6:
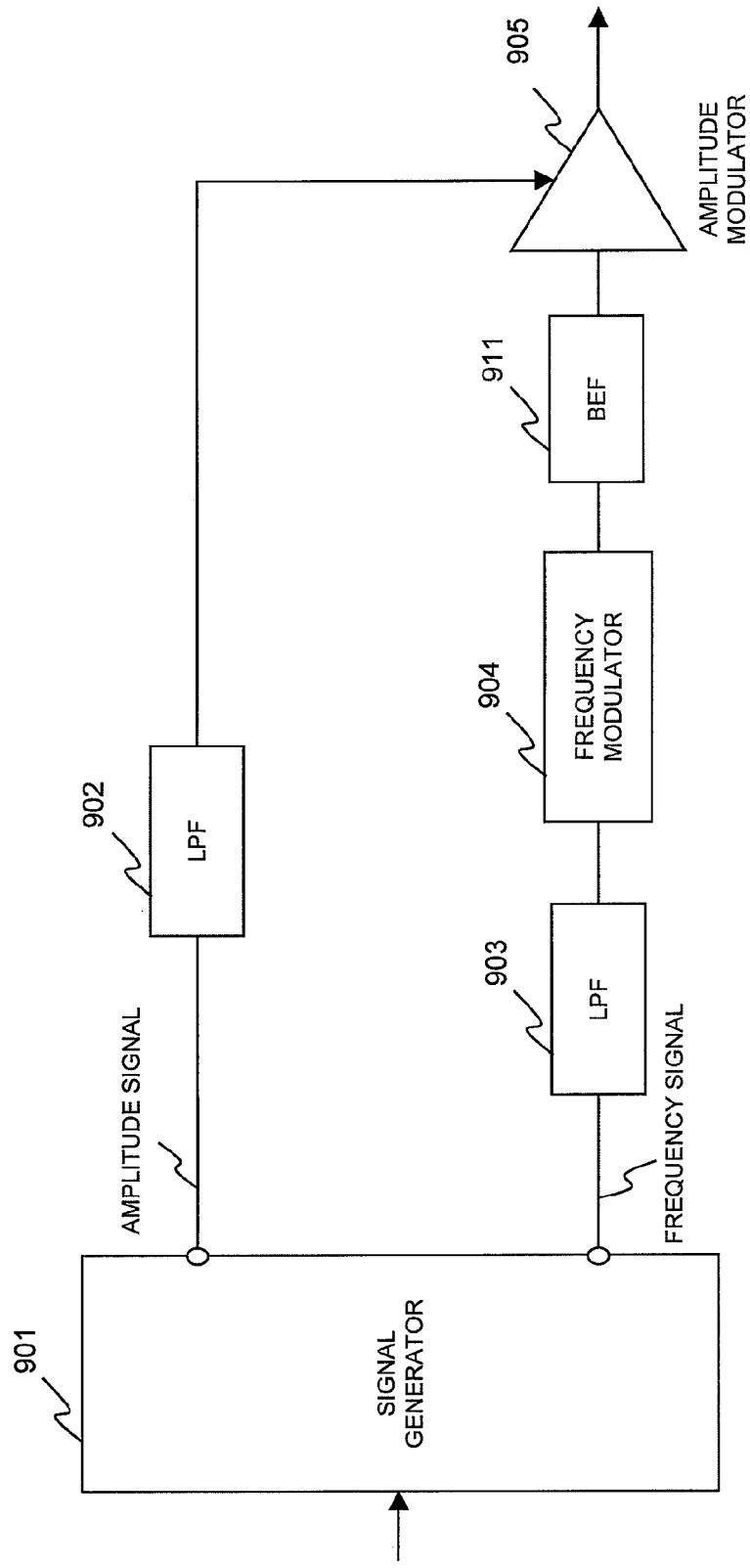
FIG. 6 is a diagram showing a transmitter circuit 910 including a BEF.

FIG. 3 is a diagram showing a communication device 300 according to a third embodiment of the present invention. In FIG. 3, the communication device 300 includes a transmitter circuit 301, a receiver circuit 302, an antenna duplexer 303, and an antenna 304. As the transmitter circuit 301, the transmitter circuits 100 and 200 according to the first and second embodiments of the present invention described above are adopted.

The antenna duplexer 303 transfers, to the antenna 304, a transmission signal outputted from the transmitter circuit 301, and prevents the transmission signal from leaking into the receiver circuit 302. Furthermore, the antenna duplexer 303 transfers, to the receiver circuit 302, a reception signal inputted from the antenna 304, and prevents the reception signal from leaking into the transmitter circuit 301. The transmission signal is outputted from the transmitter circuit 301 and released out into open space from the antenna 304 via the antenna duplexer 303. The reception signal is received by the antenna 304, and then received by the receiver circuit 302 via the antenna duplexer 303.

Needless to say, since the transmitter circuits 100 and 200 according to the first and second embodiments of the present invention are adopted as the transmitter circuit 301, the same effects as those described in the first and second embodiments of the present invention can be obtained from the transmitter circuit 301.

As described above, in the communication device 300 according to the third embodiment of the present invention, the transmitter circuit 301 includes a BEF in the frequency signal path, for solving the problem of tradeoff between an ACLR and a noise in a receiver band. Moreover, the transmitter circuit 301 can amplitude-modulate and output an angle-modulated wave in such a manner that the characteristic obtained by attenuating an unnecessary frequency band by the BEF is not lost.

Furthermore, since the output of the transmitter circuit 301 is not branched by a directional coupler and the like, it is possible to reduce a loss that occurs in between the transmitter circuit 301 and the antenna 304, which enables reduction in the electricity consumed at the time of transmission, allowing a prolonged usage as a wireless communication device. The communication device 300 may have a configuration that includes only the transmission circuit 301 and the antenna 304.

While the invention has been described in detail, the foregoing description is in all aspects illustrative and not restrictive. It is understood that numerous other modifications and variations can be devised without departing from the scope of the invention.

What is claimed is:

1. A transmitter circuit which outputs a transmission signal by performing a polar modulation on an input signal, the transmitter circuit comprising:

a signal generator that generates an amplitude signal and a phase signal based on the input signal;

a signal processor that divides the phase signal into a real component and an imaginary component, and performs a signal process on each of the real component and the imaginary component;

a filter that attenuates unnecessary frequency bands of a real component signal and an imaginary component signal, respectively, which are obtained as a result of the signal process performed by the signal processor;

a coordinate system converter that converts an orthogonal coordinate system, which is represented by the real component signal and the imaginary component signal of which the unnecessary frequency bands have been attenuated by the filter, to a polar coordinate system, which is represented by an amplitude component signal and a phase component signal;

an adder that adds the amplitude component signal provided by the coordinate system converter, to the amplitude signal generated by the signal generator;

an angle modulator that angle-modulates the phase component signal provided by the coordinate system converter; and an amplitude modulator that amplitude-modulates the phase component signal which has been angle-modulated by the angle modulator, based on the amplitude signal which has the amplitude component signal added thereto and which is provided by the adder.

2. The transmitter circuit according to claim 1, wherein the filter is a band elimination filter.

3. The transmitter circuit according to claim 1, wherein the filter is a low-pass filter.

4. The transmitter circuit according to claim 1, further comprising:

a low-pass filter that allows a desired frequency band of the amplitude signal, which has the amplitude component signal added thereto and which is provided by the adder, to pass therethrough; and a pre-emphasis filter that compensates for a characteristic of attenuation, which is performed by the low-pass filter, on the amplitude component signal provided by the coordinate system converter.

5. The transmitter circuit according to claim 1, further comprising:

a low-pass filter that allows a desired frequency band of the amplitude signal, which has the amplitude component signal added thereto and which is provided by the adder, to pass therethrough;

an amplitude amplifier that amplifies the amplitude signal which has passed through the low-pass filter; and a pre-emphasis filter that compensates for a characteristic of attenuation, which is performed by the low-pass filter and the amplitude amplifier, on the amplitude component signal provided by the coordinate system converter.

6. The transmitter circuit according to claim 1, further comprising a low-pass filter that allows a desired frequency band of the phase component signal, which is provided by the coordinate system converter, to pass therethrough.

7. A communication device comprising:

a transmitter circuit that generates a transmission signal; and an antenna that outputs the transmission signal generated by the transmitter circuit, wherein the transmitter circuit is the transmitter circuit according to claim 1.

8. The communication device according to claim 7, further comprising:

a receiver circuit that processes a reception signal received from the antenna; and an antenna duplexer that outputs, to the antenna, the transmission signal generated by the transmitter circuit, and outputs, to the receiver circuit, the reception signal received from the antenna.

9. A transmission method of outputting a transmission signal by performing a polar modulation on an input signal, the transmission method comprising the steps of:

generating an amplitude signal and a phase signal, based on the input signal;

dividing the phase signal into a real component and an imaginary component, and performing a signal process on each of the real component and the imaginary component;

attenuating unnecessary frequency bands of a real component signal and an imaginary component signal, respectively, which are obtained as a result of the signal process;

converting an orthogonal coordinate system, which is represented by the real component signal and the imaginary component signal of which the unnecessary frequency bands have been attenuated, to a polar coordinate system, which is represented by an amplitude component signal and a phase component signal;

adding the amplitude component signal to the amplitude signal;

angle-modulating the phase component signal; and amplitude-modulating the phase component signal which has been angle-modulated, based on the amplitude signal which has the amplitude component signal added thereto.

* * * * *